United States Patent
Ersal et al.

(10) Patent No.: US 12,122,365 B2
(45) Date of Patent: Oct. 22, 2024

(54) CONTINGENT MODEL PREDICTIVE CONTROL INCORPORATING ONLINE ESTIMATION OF NOMINAL AND UNCERTAIN PARAMETERS

(71) Applicant: THE REGENTS OF THE UNIVERSITY OF MICHIGAN, Ann Arbor, MI (US)

(72) Inventors: Tulga Ersal, Ann Arbor, MI (US); Jeffrey L. Stein, Ann Arbor, MI (US); John B. Wurts, Ann Arbor, MI (US); James Dallas, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 411 days.

(21) Appl. No.: 17/363,797

(22) Filed: Jun. 30, 2021

(65) Prior Publication Data
US 2022/0001861 A1 Jan. 6, 2022

Related U.S. Application Data

(60) Provisional application No. 63/047,064, filed on Jul. 1, 2020.

(51) Int. Cl.
*B60W 30/09* (2012.01)
*B60W 10/04* (2006.01)
(Continued)

(52) U.S. Cl.
CPC ............ *B60W 30/09* (2013.01); *B60W 10/04* (2013.01); *B60W 10/20* (2013.01);
(Continued)

(58) Field of Classification Search
CPC ...... B60W 30/09; B60W 10/04; B60W 10/20; B60W 30/0956; B60W 2520/26;
(Continued)

(56) References Cited

U.S. PATENT DOCUMENTS

| 10,836,383 B2 | 11/2020 | Ersal et al. |
| 2020/0189573 A1* | 6/2020 | King .................... G05D 1/0223 |
| 2020/0406969 A1 | 12/2020 | Ersal et al. |

OTHER PUBLICATIONS

M. Wielitzka, M. Dagen and T. Ortmaier, "State and maximum friction coefficient estimation in vehicle dynamics using UKF," 2017 American Control Conference (ACC), Seattle, WA, USA, 2017, pp. 4322-4327, doi: 10.23919/ACC.2017.7963620. (Year: 2017).*

(Continued)

*Primary Examiner* — Russell Frejd
*Assistant Examiner* — Ana D Thomas
(74) *Attorney, Agent, or Firm* — Quarles & Brady LLP (57) ABSTRACT

Systems and methods are provided for uncertainty based contingency model predictive control of a vehicle in uncertain road conditions. Applications may be found for collision imminent steering, on-road autonomous vehicles and real time decision-making influenced by an unknown environment. An uncertainty road coefficient of friction may be estimated using an Unscented Kalman filter, and the controller may be updated based upon the estimated uncertainties to provide for collision avoidance in unknown conditions.

20 Claims, 6 Drawing Sheets
(3 of 6 Drawing Sheet(s) Filed in Color)

(51) Int. Cl.
B60W 10/20 (2006.01)
B60W 30/095 (2012.01)
(52) U.S. Cl.
CPC ..... B60W 30/0956 (2013.01); *B60W 2520/26* (2013.01); *B60W 2552/40* (2020.02); *B60W 2552/53* (2020.02)
(58) Field of Classification Search
CPC ......... B60W 2552/40; B60W 2552/53; B60W 2050/0033; B60W 2050/0088; B60W 2530/10; B60W 2530/201; B60W 40/068; B60W 60/0015
See application file for complete search history.

(56) References Cited

OTHER PUBLICATIONS

Ji, Jie, et al. "Path planning and tracking for vehicle collision avoidance based on model predictive control with multiconstraints." IEEE Transactions on Vehicular Technology 66.2 (2016): 952-964. (Year: 2016).*
S. W. Kim, Y. Woo Jeong, J. S. Kim, S.-H. Lee and C. C. Chung, "Vehicular Vertical Tire Forces Estimation Using Unscented Kalman Filter," 2019 12th Asian Control Conference (ASCC), Kitakyushu, Japan, 2019, pp. 325-330. (Year: 2019).*
Funke, Joseph, et al. "Collision avoidance and stabilization for autonomous vehicles in emergency scenarios." IEEE Transactions on Control Systems Technology 25.4 (2016): 1204-1216. (Year: 2016).*
Alsterda et al., Contingency Model Predictive Control for Automated Vehicles, In 2019 Annual American Control Conference, 2019, 718-722.
Anderson et al., An Optimal-Control-Based Framework for Trajectory Planning, Threat Assessment, and Semi-Autonomous Control of Passenger Vehicles in Hazard Avoidance Scenarios, International Journal of Vehicle Autonomous Systems, 2010, 8(2-4): 190-216.
Borrelli et al., MPC-Based Approach to Active Steering for Autonomous Vehicle Systems, International Journal of Vehicle Autonomous Systems, 2005, 3(2/3/4):265.
Brown et al., Safe Driving Envelopes for Path Tracking in Autonomous Vehicles, Control Engineering Practice, 2017, 61:307-316.
Chakraborty et al., Time-Optimal Vehicle Posture Control to Mitigate Unavoidable Collisions Using Conventional Control Inputs, In American Control Conference, 2013, 2165-2170.
Chen et al., Design of Lane Keeping System Using Adaptive Model Predictive Control, In 2014 IEEE International Conference on Automation Science and Engineering, 2014, 922-926.
Dallas et al., Online Terrain Estimation for Autonomous Vehicles on Deformable Terrains, 2019, arXiv preprint arXiv:1908.00130.
Falcone et al., Predictive Active Steering Control for Autonomous Vehicle Systems, IEEE Transactions on Control Systems Technology, 2007, 15(3):566-580.
Ji et al., Adaptive-Neural-Network-Based Robust Lateral Motion Control for Autonomous Vehicle at Driving Limits, Control Engineering Practice, 2018, 76:41-53.
Kolas et al., Constrained Nonlinear State Estimation Based on the UKF Approach, Computers & Chemical Engineering, 2009, 33(8):1386-1401.
Laurense et al., Path-Tracking For Autonomous Vehicles at the Limit of Friction, In American Control Conference, 2017, 5586-5591.
Liu et al., A Study on Model Fidelity for Model Predictive Control-Based Obstacle Avoidance in High-Speed Autonomous Ground Vehicles, Vehicle System Dynamics, 2016, 54(11):1629-1650.
Liu et al., Combined Speed and Steering Control in High Speed Autonomous Ground Vehicles for Obstacle Avoidance Using Model Predictive Control, IEEE Transactions on Vehicular Technology, 2017, 66(10):8746-8763.
Schwarting et al., Safe Nonlinear Trajectory Generation for Parallel Autonomy with a Dynamic Vehicle Model, IEEE Transactions on Intelligent Transportation Systems, 2017, 19(9):2994-3008.
Shim et al., Understanding the Limitations of Different Vehicle Models for Roll Dynamics Studies, Vehicle System Dynamics, 2007, 45(3):191-216.
Wachter et al., On the Implementation of an Interior-Point Filter Line-Search Algorithm for Large-Scale Nonlinear Programming, Mathematical Programming, 2006, 106(1):25-57.
Wan et al., The Unscented Kalman Filter for Nonlinear Estimation, In IEEE Adaptive Systems for Signal Processing, Communications, and Control Symposium, 2000, 153-158.
Wurts et al., Collision Imminent Steering Using Nonlinear Model Predictive Control, In 2018 Annual American Control Conference, 2018, 4772-4777.
Wurts et al., Minimum Slip Collision Imminent Steering in Curved Roads Using Nonlinear Model Predictive Control, In 2019 Annual American Control Conference, 2019, 3975-3980.

\* cited by examiner

Prior Art

CONTINGENT MODEL PREDICTIVE CONTROL INCORPORATING ONLINE ESTIMATION OF NOMINAL AND UNCERTAIN PARAMETERS

CROSS-REFERENCES TO RELATED APPLICATIONS

This application claims priority to U.S. Patent Application No. 63/047,064 filed Jul. 1, 2020, which is incorporated herein by reference as if set forth in its entirety for all purposes.

STATEMENT REGARDING FEDERALLY SPONSORED RESEARCH

Not Applicable.

BACKGROUND OF THE INVENTION

1. Field of the Invention

This disclosure relates to systems and methods of autonomously controlling a ground vehicle. More specifically, this invention relates to systems and methods of uncertainty-based contingent model control of a vehicle up to its dynamic limits of handling to avoid collisions.

2. Description of the Related Art

Recently, the advancement of active safety features has drawn interest to assist human drivers in safety critical scenarios, for example in the case of collision imminent steering (CIS), e.g., Wurts et al. (2018, 2019). In such a scenario, a vehicle is forced to perform immediate evasive steering to avoid a forward collision where braking alone is insufficient due to the near proximity of an obstacle. Due to the aggressive nature of this maneuver, the vehicle is often pushed near its handling limits, requiring accurate modeling of the vehicle's nonlinearities and hence a nonlinear control formulation.

Model predictive control (MPC) has drawn interest in such applications, as it allows for one to formally and explicitly implement safety constraints and vehicle dynamics, e.g., Liu et al. (2017); Anderson et al. (2010); Chakraborty et al. (2013); Schwarting et al. (2017); Brown et al. (2017). However, such approaches often rely on exact knowledge of the system and environment parameters and may not be suitable for situations where the environment is only partially known, such as when road conditions are unknown a priori, e.g., Wurts et al. (2019); Liu et al. (2017); Laurense et al. (2017). Such a scenario is likely to occur in practice, for example when the road friction is reduced due to rain, ice, or snow. While the feedback nature of MPC inherently provides a level of robustness in terms of model discrepancy, large uncertainties in models can still lead to failure, e.g., Liu et al. (2017). In fact, due to the sensitivity of tire models to the coefficient of friction, a deviation of just 2% can lead to failure in certain scenarios, e.g., Laurense et al. (2017). As such, being able to learn these parameters and adapt the controller in real time is critical in safely transitioning autonomous features from controlled and known experimental situations to the real world.

To address this need, researchers have considered estimating the coefficient of friction and updating control strategies online, e.g., Chen et al. (2014); Ji et al. (2018); Falcone et al. (2007); Borrelli et al. (2005). Chen et al. (2014) utilized MPC with a linear time-varying vehicle model for the design of a lane keeping system. Ji et al. (2018) utilized a cornering stiffness based model for lateral motion control and path tracking. Finally, Falcone et al. (2007) used a nonlinear vehicle model with Pacejka tire models in non-linear MPC (NMPC); however, due to high computational costs, the model is only suitable for low speed operation and a linearized model is utilized for high speed operation. Further, Falcone et al. (2007) assume a trajectory is known a priori and employ MPC in an attempt to follow the trajectory. A similar study was also reported by Borrelli et al. (2005).

While the results of these studies are promising, two limitations of them must be considered when vehicles are operating at high speeds and are pushed near their handling limits. First, linearization can lead to large discrepancies between the control model and the physical system, which poses safety issues, especially considering the high speeds and aggressive nature of CIS maneuvers, e.g., Liu et al. (2017); Wurts et al. (2019). Second, if the trajectory planning and trajectory tracking problems are decoupled as in these studies, safety issues may arise in CIS, where the vehicle is operating near its handling limits. This results from the fact that without a complete understanding of the vehicle's handling limits, planners can generate reference trajectories that the vehicle may not be able to follow no matter how sophisticated the trajectory trackers may be.

Alsterda et al. (2019) address the problem of operating on unknown road conditions by contingent MPC (CMPC), a selectively robust MPC formulation designed to address the conservative nature of robust MPC (RMPC). In this approach, two separate predictions are solved by MPC simultaneously; a nominal and a contingent prediction. The objective is to find a feasible control such that the initial control move of the nominal and contingent models are consistent. In this way, it was demonstrated that contingent MPC can outperform deterministic MPC when preparing for an ice covered terrain instead of snow. While this approach proposes a method for planning for these discrete scenarios, additional robustness could be achieved by not necessarily planning for two separate scenarios, but by learning about the coefficient of friction online and exploiting the uncertainty of the learned parameter in a similar manner as contingent MPC.

Based upon this review, it is evident that a need exists in learning the road conditions online and incorporating these observations in a control architecture suitable for scenarios where vehicles are operating near their handling limits.

SUMMARY OF THE INVENTION

The present disclosure provides an uncertainty based contingency model predictive control formulation for uncertain road conditions. While this disclosure focuses specifically on a collision imminent steering application, the approach could be applied to on-road autonomous vehicles and a more general class of systems where real time decision-making is influenced by an unknown environment.

In one configuration, a driving control system for a vehicle is provided. The vehicle control system is configured to steer wheels of the vehicle, and includes a plurality of sensors coupled to the vehicle. The system also includes a controller in electrical communication with the plurality of sensors and the vehicle control system. The controller is configured to execute a program to receive information about a location of an object from at least one of the plurality of sensors. The controller is also configured to determine a sequence of control inputs to avoid a collision between the vehicle and the object based on the location of the object, and to cause the vehicle control system of the vehicle to perform a vehicle maneuver based on the sequence of control inputs. The sequence of control inputs to avoid the collision is determined by; determining an optimized vehicle path to avoid a collision between the vehicle and the object based upon an initial coefficient of friction value between the vehicle and a road surface; determining a vehicle deviation from the optimized vehicle path; and updating a coefficient of friction value when the vehicle deviates from the optimized vehicle path to cause the vehicle control system to perform a correction in the vehicle maneuver based on the updated coefficient of friction value.

In one embodiment of the driving control system, updating the coefficient of friction includes using an Unscented Kalman filter (UKF) method. The UKF can include a three degree of freedom bicycle model with a state representing the coefficient of friction with trivial dynamics.

In one embodiment of the driving control system, determining the optimized vehicle path and the correction in the vehicle maneuver is performed using a nonlinear model predictive control framework. The nonlinear model predictive control (MPC) framework can include modeling the vehicle and modeling a plurality of tires coupled to the vehicle. The modeling of the plurality of tires can include determining a peak tire slip for the lower bound of a coefficient of friction. The MPC can generate a plurality of coefficient of friction estimations, and an average value of the plurality of coefficient of friction estimations can be used for the updated coefficient of friction value.

In one embodiment of the driving control system, the initial coefficient of friction value is greater than a true coefficient of friction value for the road surface, and the correction in the vehicle maneuver includes counter-steering towards an inside of a turn away from a lane boundary.

In one embodiment of the driving control system, the controller operates with at least one of a 1 kHz prediction rate or a 50 Hz measurement update, or a combination thereof.

In one embodiment of the driving control system, the controller converges on a true coefficient of friction value between the vehicle and the road surface in less than 250 milliseconds.

In one configuration, a method of controlling a vehicle to avoid obstacles is provided. The method includes detecting an object using a sensor coupled to the vehicle, the object being detected to be located at a distance from the vehicle determined by a controller. The method also includes determining an optimized vehicle path to avoid a collision between the vehicle and the object based upon an initial coefficient of friction value between the vehicle and a road surface. The method also includes determining a steering sequence to follow the predicted optimal vehicle path around the object using feedback received by the controller. The method also includes determining a vehicle deviation from the optimized vehicle path and generating an updated coefficient of friction value when the vehicle deviates from the optimized vehicle path. The method also includes performing a correction in the steering sequence based on the updated coefficient of friction value to follow an updated path around the object.

In one embodiment of the method, updating the coefficient of friction includes using an Unscented Kalman filter (UKF) method. The UKF can include a three degree of freedom bicycle model with a state representing the coefficient of friction with trivial dynamics.

In one embodiment of the method, determining the optimized vehicle path and performing the correction in the vehicle maneuver can include using a nonlinear model predictive control framework. The nonlinear model predictive control (MPC) framework can include modeling the vehicle and modeling a plurality of tires coupled to the vehicle. Modeling of the plurality of tires can include determining a peak tire slip for the lower bound of a coefficient of friction.

In one embodiment of the method, the MPC generates a plurality of coefficient of friction estimations, and an average value of the plurality of coefficient of friction estimations is used for the updated coefficient of friction value.

In one embodiment of the method, the initial coefficient of friction value is greater than a true coefficient of friction value for the road surface, and the correction in the vehicle maneuver includes counter-steering towards an inside of a turn away from a lane boundary.

In one embodiment of the method, the controller operates with at least one of a 1 kHz prediction rate or a 50 Hz measurement update, or a combination thereof.

In one embodiment of the method, the controller converges on a true coefficient of friction value between the vehicle and the road surface in less than 250 milliseconds.

These and other features, aspects, and advantages of the present invention will become better understood upon consideration of the following detailed description, drawings and appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numerals will be used to refer to like parts from Figure to Figure in the following description of the drawings.

DETAILED DESCRIPTION OF THE INVENTION

Before the present systems and methods are described, it is to be understood that the terminology used herein is for the purpose of describing particular embodiments only, and is not intended to limit the scope of the present invention.

It must be noted that as used herein and in the appended claims, the singular forms "a", "an", and "the" include plural references unless the context clearly dictates otherwise. As well, the terms "a" (or "an"), "one or more", and "at least one" can be used interchangeably herein. It is also to be noted that the terms "comprising", "including", and "having" can be used interchangeably.

Unless defined otherwise, all technical and scientific terms used herein have the same meanings as commonly understood by one of ordinary skill in the art to which this invention belongs. The terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
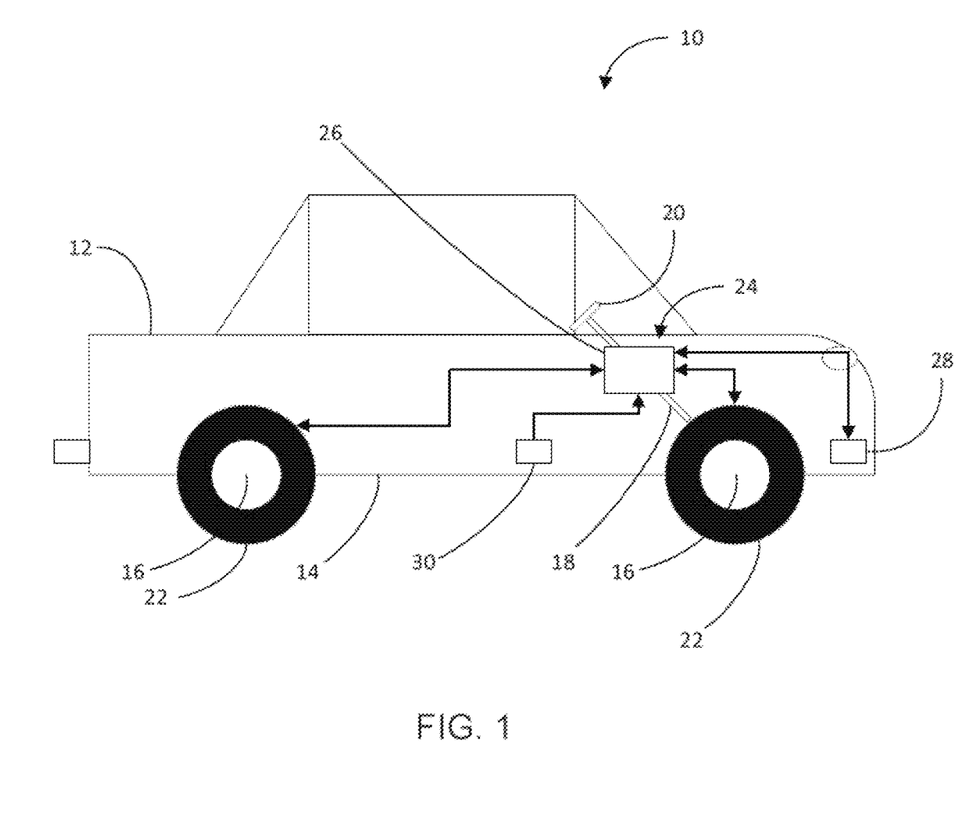
FIG. 1 is a schematic view of a vehicle having a collision imminent steering control system according to an embodiment of the disclosure.

FIG. 1 shows a vehicle 10 according to various embodiments of the disclosure. The vehicle 10 includes a body 12 received over a vehicle chassis 14. A plurality of wheels 16 are coupled to the chassis 14 and are movable relative to the body 12 using a steering mechanism 18 that is coupled to the chassis 14. The steering mechanism 18 can alter the trajectory of the vehicle 10 as it moves along a surface (e.g., a roadway 34) by rotating or steering the orientation of two or more of the wheels 16 relative to the body 12. In some embodiments, the steering mechanism 18 can include a steering wheel 20 to help an operator quickly and conveniently rotate the orientation of the wheels 16 relative to the body 12. The steering mechanism 18 can be electrically controlled, and can provide steering to the front wheels 16. Alternatively, the steering mechanism 18 can be electrically controlled, and can provide steering to both the front and rear wheels 16. In some aspects, separate steering mechanisms 18 are provided for the front wheels 16 and the rear wheels 16. Tires 22 are removably received around the wheels 16.

The vehicle 10 has a collision imminent steering (CIS) control system 24 electrically coupled to the steering mechanism 18. The CIS control system 24 can selectively autonomously control the vehicle 10 by altering the steering mechanism 18, for example. The CIS control system 24 can include a controller 26 in electrical communication with the steering mechanism 18. The controller 26 is configured to provide a steering sequence (e.g., a steering angle or steering rate) to alter the trajectory of the vehicle 10 as it drives over a surface, based upon feedback received from a variety of sensors placed throughout the vehicle 10. For example, an obstacle detection sensor 28 can be coupled to the body 12 of the vehicle 10. The obstacle detection sensor 28 can be placed in electrical communication with the controller 26, and can be positioned near a front of the vehicle 10 to provide a field of view in front of the vehicle 10. In some examples, the obstacle detection sensor 28 is a LIDAR sensor that can both detect the presence of an object and measure the distance to the detected object. Additionally, one or more motion sensors 30 can be placed about the vehicle 10 to detect various vehicle states, including vehicle velocity, yaw, position, or otherwise. In some embodiments, several motion sensors 30 can be used to detect vehicle velocity, yaw, and/or position, for example. In some embodiments, the information obtained by the motion sensors 30 can be fused, modified, and/or filtered prior to being used by the CIS control system 24.

Figure 2:
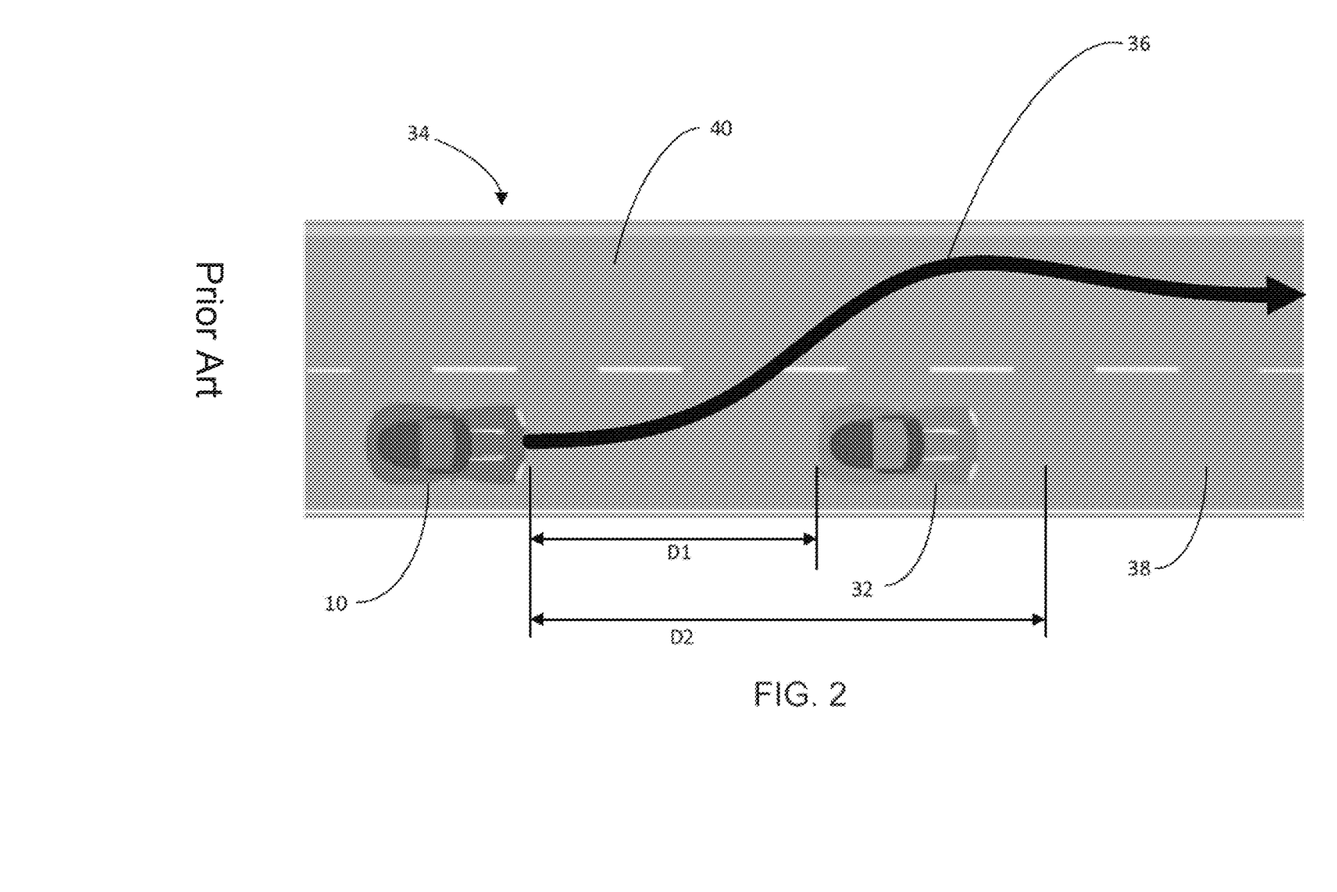
FIG. 2 is a top view of a vehicle performing a prior art method of obstacle avoidance.

In order to provide background for the invention, FIG. 2 shows a top view of the vehicle 10 performing an example prior art method of obstacle avoidance using a CIS control system 24. During operation of the vehicle 10, certain obstacles 32 may become present within the vehicle path that require avoidance. For example, when the vehicle 10 is traveling down a roadway 34, a second car 32 could be stopped in front of the vehicle 10. Due to sudden stopping of the obstacle, distractions, inattentive driving, close following distance behind the obstacle 32, or the like, the braking system of the vehicle 10, alone, may not be able to stop the vehicle 10 before it contacts the obstacle 32. Accordingly, an obstacle avoidance maneuver 36 must be performed by the vehicle 10 to avoid a collision with the obstacle 32.

The obstacle avoidance maneuver 36 can be initiated when the obstacle detection sensor 28 detects the presence of an obstacle 32. In some embodiments, the obstacle avoidance maneuver 36 is initiated when an obstacle 32 is detected at a distance D1 that is less than the braking distance D2 required to stop the vehicle. During operation of the vehicle 10, the obstacle detection sensor 28 can continuously scan for obstacles in front of the vehicle 10. If an obstacle 32 is detected in front of the vehicle 10, the obstacle detection sensor 28 can measure and report the presence of the obstacle 32 in front of the vehicle 10, the distance D1 between the obstacle 32 and the vehicle 10, and the relative velocity between the vehicle 10 and the obstacle 32. Using equation (a), for example, the controller 26 can then calculate an estimated safe braking distance D2 required to completely stop the vehicle 10 (or reduce the relative velocity between the obstacle 32 and the vehicle 10 to zero).

$$D2 = \frac{V_0^2 - V_f^2}{2 * \mu * g} \qquad (a)$$

In equation (a), $V_0$ is the current velocity of the vehicle (as measured by one of the motion sensors 30, for example), $V_f$ is the final velocity or velocity of the obstacle as measured by the obstacle detection sensor 28, $\mu$ is the coefficient of friction, and g is the acceleration due to gravity. It is noted that $V_f$ would have to be equal to zero in the case of completely stopping the vehicle. This equation is accurate for the straight road case; curved roads were solved numerically for the present disclosure. The coefficient of friction $\mu$ can be a measured value or can be stored in the vehicle 10, and can be accessed by the controller 26. For example, the controller 26 can have a default setting of $\mu$=0.8, which is a reasonable estimate for a coefficient of friction value for standard tires on dry pavement. Although the formula for estimating safe braking distance D2 is provided, the safe braking distance D2 can also be determined in other ways. For example, the safe braking distance D2 can be determined by the controller 26 using data from past manufacturer testing or live data acquisition.

Using the estimated safe braking distance D2 needed to safely stop the vehicle and the measured distance D1 between the vehicle 10 and the obstacle 32, the controller 26 of the CIS control system 24 can continuously evaluate whether driving assistance is necessary to safely operate the vehicle 10. If the measured distance D1 between the vehicle 10 and the obstacle 32 is greater than the estimated safe braking distance D2, normal operation of the vehicle 10 can continue. If the measured distance D1 between the vehicle 10 and the obstacle 32 is measured to be less than or equal to the estimated safe braking distance D2, the CIS control system 24 can override the normal input (e.g., manual rotation of the steering wheel 20) to the steering mechanism 18, and can control and direct the vehicle through an obstacle avoidance maneuver 36 to prevent a collision.

Further details on methods of obstacle avoidance using a CIS control system can be found in U.S. Pat. No. 10,836,383 to Ersal et al., which is incorporated by reference as if set forth in its entirety herein for all purposes. Further details on vehicle lane change systems can be found in U.S. Patent Application Publication No. 2020/0406969 to Ersal et al., which is incorporated by reference as if set forth in its entirety herein for all purposes.

Figure 3:
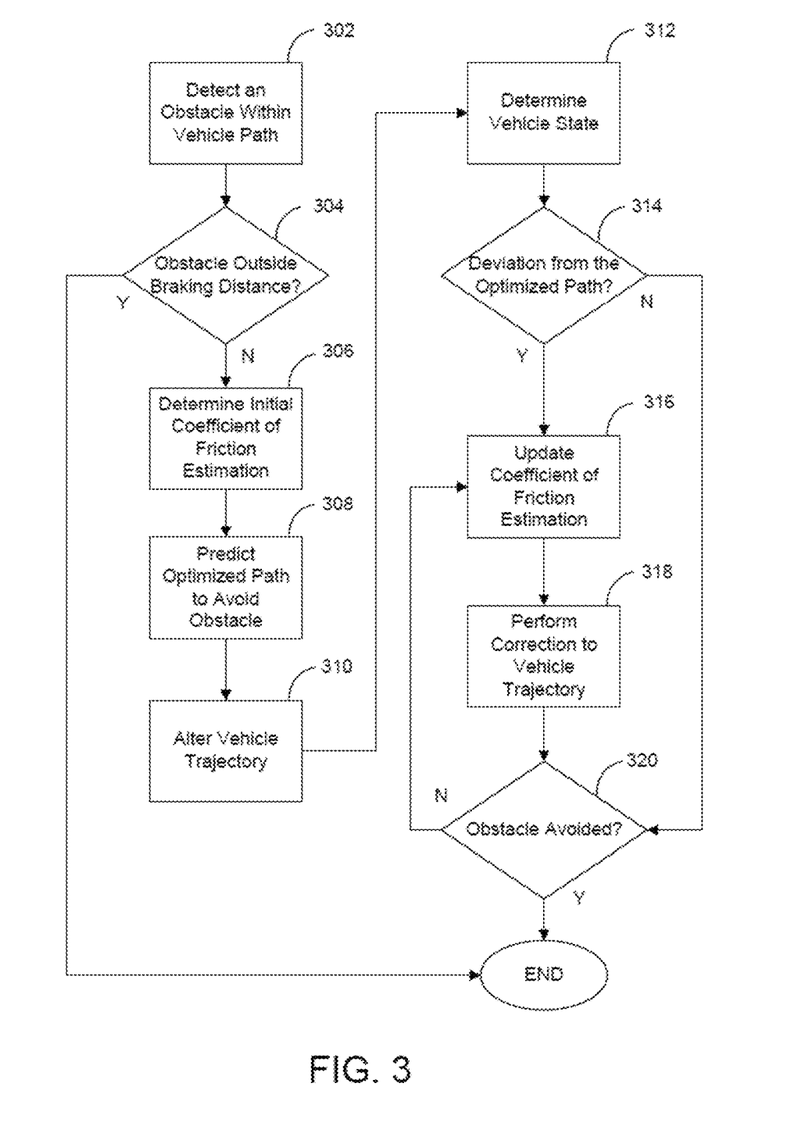
FIG. 3 is a flow chart showing non-limiting example steps of an uncertainty-based contingent model predictive control of a vehicle operating in uncertain environments.

Referring to FIG. 3, a flowchart of non-limiting example steps for uncertainty-based contingent model predictive control of a vehicle operating in uncertain environments is shown. An obstacle may be detected within a vehicle path at step 302, such as by using a plurality of sensors. If the obstacle is outside the braking distance of the vehicle at step 304, then the process may end as the vehicle will be able to stop in time to avoid a collision. If the obstacle is not outside the vehicle braking distance at step 304, then an initial coefficient of friction estimation may be determined at step 306. An optimized path may be generated based upon the initial coefficient of friction estimation at step 308, which will avoid a collision between the vehicle and the obstacle. The trajectory of the vehicle may then be altered at step 310 to follow the optimized path and to avoid the collision. The state of the vehicle may be assessed a short time later at step 312, such as a fraction of a second later, to assess whether the vehicle is following the optimized path. If the vehicle deviates from the optimized path at step 314, the coefficient of friction estimation may be updated at step 316. A correction to the vehicle trajectory may be performed at step 318 based upon the updated coefficient of friction estimation. After the correction at step 318, or if there is no deviation from the optimized path at step 314, then a determination of whether the obstacle has been avoided may be performed at step 320. If the obstacle has been avoided, then the process may end. If the obstacle has not been avoided, then the coefficient of friction estimation may be updated and the process repeated from step 316 until the obstacle has been avoided.

The uncertainty road coefficient of friction may be estimated using numerical filtering techniques, such as an Unscented Kalman Filter. The present disclosure leverages an Unscented Kalman Filter, but a plurality of filters exist to estimate uncertain parameters. The controller may be updated based upon the estimated uncertainties, as described below. The utility of the uncertainty based controller is demonstrated in a collision imminent steering scenario and compared to nominal deterministic model predictive control, as well as a baseline adaptive scheme.

The following Example is provided in order to demonstrate and further illustrate certain embodiments and aspects of the present invention and is not to be construed as limiting the scope of the invention. The statements provided in the Example are presented without being bound by theory.

EXAMPLE

1. Overview of this Example

In this Example, a novel uncertainty based contingent model predictive control algorithm is presented for autonomous vehicles operating in uncertain environments. Nominal model predictive control relies on a model to predict future states over a horizon and hence requires accurate models and parameterization. In application, environmental conditions and parameters, such as the road coefficient of friction, may be unknown or varying, posing issues for model predictive control. This Example presents a new selectively robust adaptive model predictive control algorithm to address uncertainties in the road coefficient of friction by estimating the coefficient of friction through Unscented Kalman filtering and updating the controller based upon the estimated uncertainties. The utility of the uncertainty based controller is demonstrated in a collision imminent steering scenario and compared to nominal deterministic model predictive control, as well as a baseline adaptive scheme. The results suggest the uncertainty based controller can improve the robustness of model predictive control by nearly 50% for deterministic model predictive control and over 10% for the baseline adaptive scheme.

In a second section of this Example, the CIS problem, vehicle modeling, terrain estimation, and uncertainty based contingent MPC are presented. In a third section of this Example, the impact of uncertain road conditions on controller error are presented along with the integration of terrain estimation to mitigate these resulting errors. A fourth section of this Example discusses the utility of the uncertainty based contingent MPC formulation. A fifth section of this Example draws the concluding remarks of the study of this Example.

2. Problem Formulation 2.1 Collision Imminent Steering

The CIS scenario occurs in high speed applications, for example highway operation, and begins with a vehicle centered in the right lane of a curved highway and travelling at 35 m/s. At time to the vehicle identifies an obstruction in the right lane 55 m ahead. Due to the high speed of the vehicle, there is insufficient time for the vehicle to brake to prevent collision, which requires a 62.4 m lead at a peak deceleration of 1g, where g is the gravitational acceleration. As such, the vehicle must perform an emergency lane change into the left lane to prevent collision. For the purposes of this Example, the maneuver is considered safe if the vehicle (i) avoids collision with the obstacle, (ii) does not violate the outside lane boundaries, and (iii) stabilizes in the center of the left lane. Due to the aggressive nature of this maneuver, the controller forces the vehicle to operate near its handling limits, see Wurts et al. (2018). Further information on CIS can be found in Wurts et al. (2019), U.S. Pat. No. 10,836,383, and U.S. Patent Application Publication No. 2020/0406969.

2.2 Vehicle Models

This Example utilizes two vehicle models; a 14 degree-of freedom (DoF) vehicle model representing the plant, and a 3 DoF bicycle model for predictions in the Unscented Kalman filter (UKF) and MPC framework.

In this Example, the 14 DoF model represents the ground truth. Details on the 14 DoF model can be found in Shim and Ghike (2007).

For the vehicle trajectory predictions in MPC and the UKF, the prediction model is represented as a 3 DoF bicycle model, as this has shown to be of a proper balance between level of fidelity and efficiency for short-horizon predictions, e.g., Liu et al. (2016); Dallas et al. (2019).

The bicycle model is given as $$\dot{z}(\mu^*) = \begin{bmatrix} u\cos\psi - v\sin\psi \\ u\sin\psi + v\cos\psi \\ w_z \\ 0 \\ (F_{yf}(\mu^*)\cos(\delta_f) + F_{yr}(\mu^*))/M_t - u\omega_z \\ (F_{yf}(\mu^*)\cos(\delta_f)L_f - F_{yr}(\mu^*)L_r)/I_{zz} \\ \dot{\delta}_f \end{bmatrix} \quad (1)$$

where the state vector, z, is defined as $$z := \begin{bmatrix} x \\ y \\ \psi \\ u \\ v \\ \omega_z \\ \delta_f \end{bmatrix} = \begin{bmatrix} \text{global } x \text{ position of CoM} \\ \text{global } y \text{ position of CoM} \\ \text{yaw angle} \\ \text{longitudinal velocity} \\ \text{lateral velocity} \\ \text{yaw rate} \\ \text{front steering angle} \end{bmatrix} \quad (2)$$

and $\mu^*$ is the road coefficient of friction, $M_t$ is the vehicle mass, $I_{zz}$ is the vehicle's yaw moment of inertia, and $L_f$ and $L_r$ are the distance from the vehicle's center of mass (CoM) to the front and rear axles, respectively. Finally, the tire lateral forces, $F_{yf}$ and $F_{yr}$, are given by the nonlinear Pacejka formula $$F_y(\mu^*) = -\mu^* F_z \sin\left(C \arctan\left(B\frac{V_x}{V_y}\right)\right) \quad (3)$$

where $V_x$ and $V_y$ are the tire patch velocities in the longitudinal and lateral directions, $F_z$ is the normal load on the tire, and B and C are Pacejka curve parameters, see Pacejka (2006).

2.3 Coefficient of Friction Estimation

To estimate the coefficient of friction, a UKF is utilized as described in Dallas et al. (2019), but with the prediction model given by the bicycle model and Pacejka tire model of Eqs. (1)-(3). To achieve the UKF prediction model format of Dallas et al. (2019), the bicycle model of Eq. (1) is appended with an additional state representing the coefficient of friction with trivial dynamics. The UKF utilizes this model in a predictor corrector scheme, where (i) predictions are performed by the 3-DoF bicycle model appended with the coefficient of friction, and (ii) correction is performed based upon measurements of the vehicle states. The UKF then determines the best estimate based upon the uncertainties of the measurements and the 3-DoF bicycle model. In this Example, vehicle state measurements are obtained by corrupting the 14 DoF model with Gaussian noise of standard deviations given in Table 1. A more detailed explanation of the UKF is given in Wan and Van Der Merwe (2000); Kolas et al. (2009). Although many other estimation techniques are available, the UKF is used in this Example, because it was found to offer a suitable balance between computational efficiency and estimation accuracy, see Dallas et al. (2019).

TABLE 1

Measurement standard deviations used for sensor simulation.

| State | Noise ($\sigma$) |
|---|---|
| x | 1.2 (m) |
| y | 1.2 (m) |
| $\psi$ | 0.0175 (rad) |
| u | 0.25 (m/s) |
| v | 0.25 (m/s) |
| $\omega_z$ | 0.0175 (rad/s) |

2.4 Model Predictive Control Formulation

The nonlinear MPC formulation extends upon Wurts et al. (2019), which also serves as the nominal deterministic MPC formulation for benchmarking purposes. Briefly, the formulation is designed to minimize the peak tire slip, thereby minimizing the aggressiveness of the maneuver while maximizing available control authority. A more detailed explanation can be found in Wurts et al. (2019). To map the control inputs to future vehicle states, the RK4 integration scheme is applied to an augmented vector of Eq. (1) to apply contingent MPC. Thus, the augmented dynamics become $$\dot{z}_c(\mu^*) = \begin{bmatrix} \dot{z}(\mu_1) \\ \dot{z}(\mu_2) \end{bmatrix} \quad (4)$$

with the control input, u, being $$u = \begin{bmatrix} u^{\mu_1} \\ u^{\mu_2} \end{bmatrix} = \begin{bmatrix} \dot{\delta}_f^{\mu_1} \\ \dot{\delta}_f^{\mu_2} \end{bmatrix} \quad (5)$$

With $\dot{\delta}_f$ being the steering rate of the front tires and $\mu_1$ and $\mu_2$ representing lower and upper bounds on the confidence interval of the estimate of the coefficient of friction, respectively. For this work, one, two, and three standard deviations bounds in the coefficient of friction are analyzed, which are reported to MPC by the UKF at each new MPC iteration. The formulation is then extended to a contingent MPC formulation as follows.

$$\min_u \ (u_1^{\mu_1} - u_1^{\mu_2})^2 + \frac{1}{\rho_{obj}} \ln \sum_{i=1}^n e^{\rho_{obj}|\alpha_i^{\mu_1}|} \quad (6)$$

subject to $$\begin{bmatrix} d_i^{left\,edge} \\ d_i^{right\,edge} \\ |\alpha_{f,i}| - \alpha^{peak} \\ |\alpha_{r,i}| - \alpha^{peak} \\ |\delta_f(t_i)| - \delta_f^{max} \\ |\dot{\delta}_f(t_i)| - \dot{\delta}_f^{max} \end{bmatrix} \leq 0 \quad \forall\, i \in [1, n]$$

$$(x_t)_i - (x_{stable})_i = 0 \quad \forall\, i \in [4, 8]$$

$$(x_t - x_c)^2 + (y_t - y_c)^2 = r_{lane}^2$$

$$\arctan\left(\frac{y_t - y_c}{x_t - x_c}\right) = \frac{\pi}{2} - \arctan\left(\frac{v_t}{u_0}\right)$$

where $\rho_{obj}$ is the aggregation parameter, $d^{left\ edge}$, $d^{right\ edge}$ are constraints to remain within the edges of the drivable tube, $\alpha_{f,r}$ are the tire slip angles at the front and rear tires, $\alpha^{peak}$ is the peak slip angle constraint, and $\delta_f^{max}$ and $\dot{\delta}_f^{max}$ are constraints on the maximum steering angle and steering rate of the front tires. Finally, $x_f$ represents the terminal state, $(x_c, y_c)$ represents the terminal road arc position, and $r_{lane}$ is the road radius of curvature.

While the equality and inequality constraints maintain consistency with Wurts et al. (2019), there are several differences in the formulation of the cost function of Eq. (6). First, the contribution of the peak tire slip to the cost is only calculated for the lower bound of the coefficient of friction, $\mu_1$. This is because the lower coefficient of friction makes it harder for the vehicle to induce the lateral force necessary to satisfy the problem constraints, hence forcing a larger slip angle, effectively pushing the vehicle towards its handling limits. Second, an additional cost is added to attempt to force the first control moves of the two contingency models to be equal. Here it is suggested that only the first control move of each contingency model be equal, as only the initial control move is applied and future control inputs are discarded in the next MPC iteration. In the case that $u_1^{\mu_1}$ and $u_1^{\mu_2}$ are not equal, an average of the two is sent to the controller, as this represents the current best estimate of $\mu$. This situation would occur if the vehicle is quite close to the obstacle and the constraints are active for both contingency models. For this Example, a 3.2 second time horizon with 50 millisecond discretization time step is used to represent current automotive architectures. Hence a zero order hold is placed on the first control move that is sent to the plant. Finally, the equality and inequality constraints are applied to relevant variables of both contingency models. Finally, the optimal control problem (OCP) of Eq. (6) is solved through IPOPT (see Wachter and Biegler (2006)) and the trajectory is simulated over a custom CUDA platform. The peak computation time of the UKF is less than 770 μs. The CUDA wall time is 800 microseconds (μs) and the total wall time is between 80 milliseconds (ms) and 4 seconds. However, it is worth noting that the total wall time is composed mostly of solve time in IPOPT, not simulating candidate trajectories, and hence can be improved with a more efficient solver.

3. MPC Prediction Error and Integration of UKF 3.1 MPC Prediction Error

The uncertainty of the coefficient of friction manifests in MPC error due to the inaccuracies of the resulting bicycle model predictions over the horizon. A misrepresentation of the coefficient of friction can result in two conditions: the plant is over-responsive or under-responsive. When the predicted coefficient of friction is lower than the true plant value, the plant is over-responsive and results in more aggressive turns than intended by the controller. This can result in overturning into the obstacle when the controller attempts to turn in avoidance of the outer lane boundary. In the case that the predicted coefficient of friction is larger than the true plant value, the plant is under-responsive and reacts by less aggressive turning than intended by the controller. This results in failure, since the vehicle drifts outside of the outer lane boundary instead of correctly counter-steering back towards the inside of the turn. This under-responsive case is the focus of this Example and correlates to the scenario of a vehicle suddenly encountering degraded road conditions in terms of reduced friction, such as a patch of ice or snow.

Figure 4:
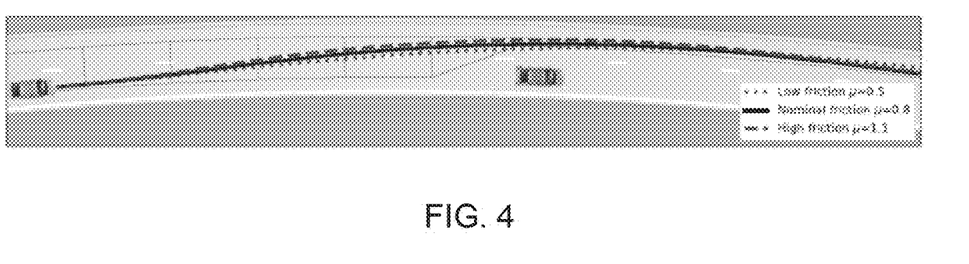
FIG. 4 shows open loop trajectory for low coefficient of friction (red dotted line), nominal (black solid line), and high coefficient of friction (green dashed line) under same control inputs. Blue lines represent the safe drivable tube.

To demonstrate these MPC errors, the impact of the coefficient of friction is depicted in FIG. 4 for a low coefficient of friction (red dotted line), a nominal value (black solid line), and a high coefficient of friction (green dashed line) under the same open-loop control input. As such, the proposed CMPC attempts to address this scenario by finding a feasible solution through estimating both lower and upper bounds on the confidence interval of the coefficient of friction estimate. By doing so, bounds are placed on the prediction error such that the CIS maneuver can be completed in a safe manner, as described in Sec. 2.1. This applies a more conservative adaptation to the road conditions than directly utilizing the current best estimate of the coefficient of friction.

3.2 Terrain Estimator and MPC Integration

To address the prediction error described in Sec. 3.1, the UKF estimator is implemented to run in parallel with contingent MPC as follows. First, the UKF is running at a 1 kHz prediction rate with a 50 Hz measurement update, received from the noise-corrupted plant states. This update rate is selected to be comparable to standard sensors. At the initial time, $t_0$, in each MPC iteration, the UKF sends CMPC the current estimate of the coefficient of friction and the standard deviation of the estimate obtained from the UKF state covariance matrix. From this data, $\mu_1$ and $\mu_2$ can be calculated as required by CMPC. CMPC then solves for the optimal control input sequence for the entire prediction horizon by assuming $\mu_1$ and $\mu_2$ are held constant. The first control move generated by the OCP is sent to the plant. While the OCP is being solved, the UKF is running independently. This process is then repeated such that at the initialization of the next CMPC iteration, the UKF reports the current terrain estimate corresponding to the shifted to.

4. Results and Discussion

Figure 5:
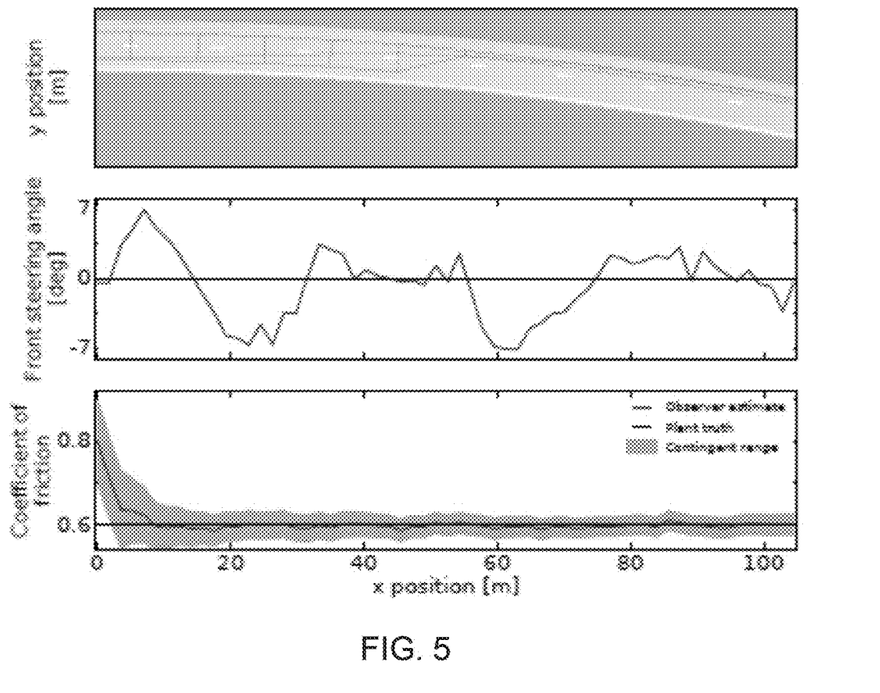
FIG. 5 shows a sample CIS maneuver for under-responsive initialization. The top plot shows the vehicle trajectory (red), the middle plot shows the steering profile of the maneuver, and the bottom plot depicts the estimator performance (solid blue line) and contingency range (shaded cyan region).

To assess the utility of the uncertainty based contingent MPC, CIS simulations were run for various controller cases. Each simulation initializes the scenario with a separate plant coefficient of friction and initial guess used by the prediction model at the beginning of an event. While the problem is initialized with these coefficients, as the simulation runs the estimator is attempting to determine an estimate of the plant's coefficient of friction. As an example, FIG. 5 shows profiles of the vehicle's trajectory, steering angle, and estimated coefficient of friction when the initial prediction model guess is 0.8 and the true plant value is 0.6. The top plot depicts the vehicle departing the right lane and successfully avoiding collision (red solid line). The UKF's ability to recover the plant coefficient of friction is depicted in the bottom plot. The estimator initially believes the coefficient to be 0.8, but rapidly converges to within 2% of the true plant value (0.6) in less than 250 ms. Such fast convergence is critical, because prior to estimator convergence, the vehicle may exhibit the over- and under-responsive behaviors mentioned in Sec. 3.1. Hence, the more rapidly the estimator can converge, the earlier corrective control inputs can be applied.

Figure 6:
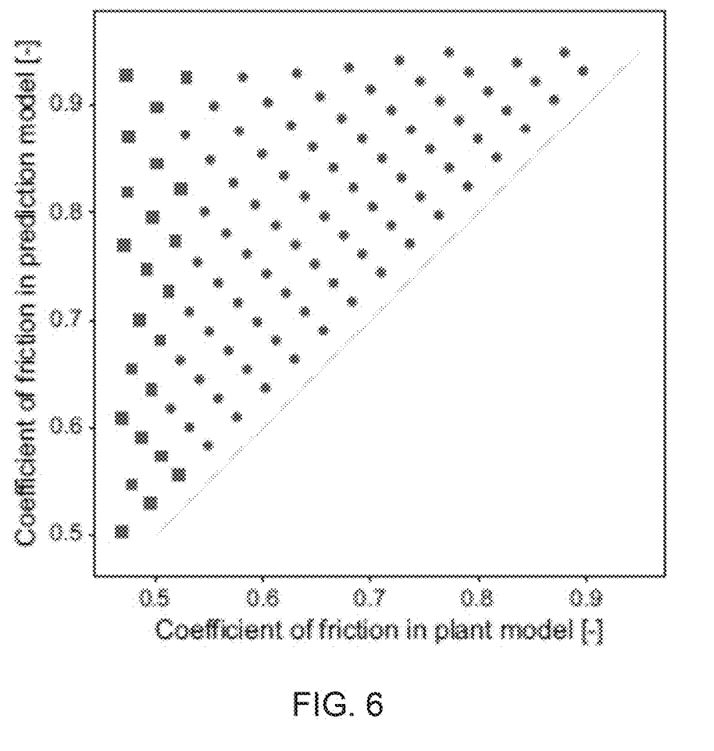
FIG. 6 shows various initializations of coefficient of friction for 1a uncertainty based MPC simulations, where a represents the standard deviation. Green dots depict success and red squares demonstrate failure in solving the optimal control problem (OCP).
Figure 7:
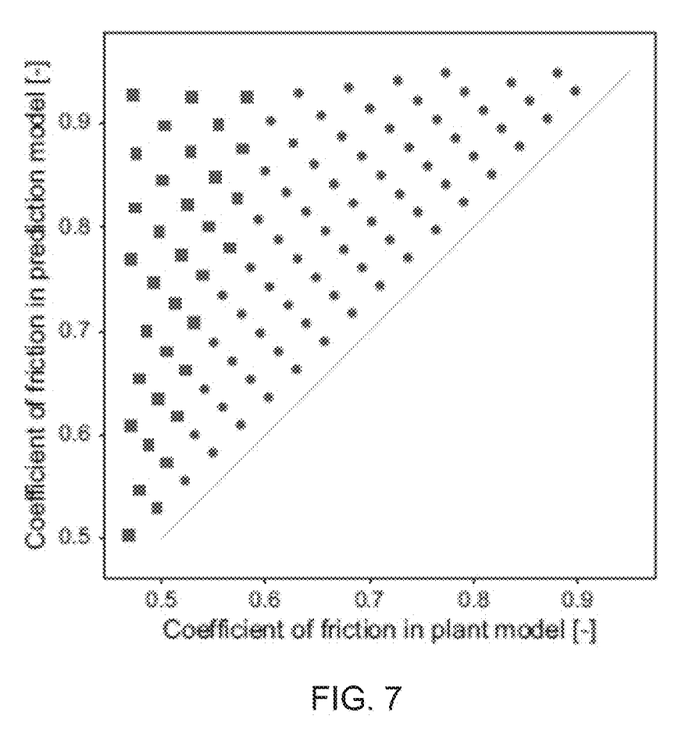
FIG. 7 shows various initializations of coefficient of friction for baseline adaptive MPC simulations. Green dots depict success and red squares demonstrate failure in solving the optimal control problem (OCP).

FIG. 6 shows the various under-responsive initializations studied. A distinct region of failure exists around a large success area. In the far left failure region, which occurs at around 0.52 plant coefficient of friction, the plant coefficient of friction is extremely low, thus reducing the vehicle's ability to generate large lateral forces. In this under-responsive scenario, failure occurs in the OCP solver due to the vehicle drifting outside of the lane boundary, as the control inputs fail to produce the required forces for successful counter-steering. At low plant coefficients of friction, below approximately 0.5, the OCP solver fails, as there is no feasible solution even with exact parameterization. This low coefficient of friction is responsible for the failure in the lower region of all points of initial prediction coefficient of friction below approximately 0.55, because the uncertainty based MPC lower bound on the coefficient of friction becomes parameterized with a value less than 0.5, causing the optimizer to fail to find a feasible solution. Finally, a success region exists where the area represents the achievable robustness to initial plant prediction mismatch. In this region, the estimator is able to successfully predict the coefficient of friction to allow for the prediction model to achieve enough accuracy as compared to the plant for a successful maneuver. In particular, the contingency based MPC formulation demonstrates the most improvement in the far left side where the plant coefficient of friction is low (0.52). This improvement becomes evident when the results for the 1σ uncertainty based contingent MPC in FIG. 6 are compared to the baseline adaptive MPC case in FIG. 7. Here, the baseline adaptive MPC scheme refers to updating the MPC prediction model with the current best estimate of the coefficient of friction from the estimator, rather than the uncertainty based formulation. The area of the success region thus depicts the improvement gained by the contingency based MPC formulation.

Table 2 depicts the improvement in terms of success rate for the initial coefficient of friction mismatch. The adaptive schemes (baseline and uncertainty MPC variations) significantly expand the success region of the CIS maneuver. Furthermore, 1 contingency yields the largest success rate for initial mismatch of coefficient of friction between the plant and prediction models, with only about 20% failure. As seen in FIG. 6, the majority of failures occur at low plant coefficient of frictions where no feasible solution exists even with exact parameterization, suggesting the 1σ uncertainty based MPC covers the majority of the feasible operation range. At larger uncertainties (2 and 3 σ), the uncertainty based contingent MPC formulation becomes too conservative and degrades the performance as compared to smaller uncertainties, because the lower bound prediction model easily becomes parameterized by a low coefficient of friction (0.5) where there is no feasible solution to the problem. Hence, the lower failure region of FIG. 6 is expanded.

TABLE 2

Success rate under initial coefficient of friction mismatch.

| MPC formulation | Success rate |
|---|---|
| Deterministic | 29.2% |
| Baseline adaptive | 67.9% |
| Uncertainty based MPC 1σ | 78.3% |
| Uncertainty based MPC 2σ | 64.1% |
| Uncertainty based MPC 3σ | 48.1% |

These results suggest that uncertainty based contingent MPC can improve robustness in under-responsive operation, for example when the road coefficient is degraded due to moisture or ice, and that adaptive controllers are critical when autonomous vehicles are operating in real world scenarios with only partially known or unknown road conditions.

5. Conclusion

This Example considers increasing the robustness of autonomous vehicles through adaptation to road conditions. In particular, the coefficient of friction, and its variance, is estimated online by a UKF and integrated into a new single-level uncertainty based contingent MPC. The uncertainty based contingent MPC seeks to find control moves such that vehicle models parameterized within confidence intervals of the estimate satisfy the problem formulation. Through simulation of an aggressive evasive highway maneuver, it is shown that the developed uncertainty based contingent MPC can outperform deterministic MPC and a baseline adaptive scheme by increasing the initialization error range of the road coefficient of friction for which the OCP can still be successfully solved. Therefore, it is concluded that the developed algorithm could improve the robustness of autonomous vehicles if it can be solved in real time. From this Example, one contemplates exploring various solvers and benchmarking the computational performance for uncertainty based contingent MPC.

REFERENCES

Alsterda, J., Brown, M., and Gerdes, J. C. (2019). Contingency model predictive control for automated vehicles. In 2019 *Annual American Control Conference,* 718-722.

Anderson, S. J., Peters, S. C., Pilutti, T. E., and Iagnemma, K. (2010). An optimal-control-based framework for trajectory planning, threat assessment, and semi-autonomous control of passenger vehicles in hazard avoidance scenarios. *International Journal of Vehicle Autonomous Systems,* 8(2-4), 190-216.

Borrelli, F., Falcone, P., Keviczky, T., Asgari, J., and Hrovat, D. (2005). MPC-based approach to active steering for autonomous vehicle systems. *International Journal of Vehicle Autonomous Systems,* 3(2/3/4), 265.

Brown, M., Funke, J., Erlien, S., and Gerdes, J. C. (2017). Safe driving envelopes for path tracking in autonomous vehicles. *Control Engineering Practice,* 61, 307-316.

Chakraborty, I., Tsiotras, P., and Diaz, R. S. (2013). Time-optimal vehicle posture control to mitigate unavoidable collisions using conventional control inputs. In *American Control Conference,* 2165-2170.

Chen, B. C., Luan, B. C., and Lee, K. (2014). Design of lane keeping system using adaptive model predictive control. In 2014 *IEEE International Conference on Automation Science and Engineering,* 922-926.

Dallas, J., Jain, K., Dong, Z., Cole, M. P., Jayakumar, P., and Ersal, T. (2019). Online terrain estimation for autonomous vehicles on deformable terrains. *arXiv preprint arXiv:* 1908.00130.

Falcone, P., Borrelli, F., Asgari, J., Tseng, H. E., and Hrovat, D. (2007). Predictive Active Steering Control for Autonomous Vehicle Systems. *IEEE Transactions on Control Systems Technology,* 15(3), 566-580.

Ji, X., He, X., Lu, C., Liu, Y., and Wu, J. (2018). Adaptive-neural-network-based robust lateral motion control for autonomous vehicle at driving limits. *Control Engineering Practice,* 76, 41-53.

Kolas, S., Foss, B., and Schei, T. (2009). Constrained nonlinear state estimation based on the UKF approach. *Computers & Chemical Engineering,* 33(8), 1386-1401.

Laurense, V. A., Goh, J. Y., and Gerdes, J. C. (2017). Path-tracking for autonomous vehicles at the limit of friction. In *American Control Conference,* 5586-5591.

Liu, J., Jayakumar, P., Stein, J. L., and Ersal, T. (2016). A study on model fidelity for model predictive control-based obstacle avoidance in high-speed autonomous ground vehicles. *Vehicle System Dynamics,* 54(11), 1629-1650.

Liu, J., Jayakumar, P., Stein, J. L., and Ersal, T. (2017). Combined speed and steering control in high speed autonomous ground vehicles for obstacle avoidance using model predictive control. *IEEE Transactions on Vehicular Technology*, 66(10), 8746-8763.

Pacejka, H. B. (2006). *Tyre and Vehicle Dynamics*. Butterworth-Heinemann.

Schwarting, W., Alonso-Mora, J., Paull, L., Karaman, S., and Rus, D. (2017). Safe nonlinear trajectory generation for parallel autonomy with a dynamic vehicle model. *IEEE Transactions on Intelligent Transportation Systems*, 19(9), 2994-3008.

Shim, T. and Ghike, C. (2007). Understanding the limitations of different vehicle models for roll dynamics studies. *Vehicle System Dynamics*, 45(3), 191-216.

Wachter, A. and Biegler, L. T. (2006). On the implementation of an interior-point filter line-search algorithm for large-scale nonlinear programming. *Mathematical Programming*, 106(1), 25-57.

Wan, E. and Van Der Merwe, R. (2000). The unscented Kalman filter for nonlinear estimation. In *IEEE Adaptive Systems for Signal Processing, Communications, and Control Symposium*, 153-158.

Wurts, J., Stein, J. L., and Ersal, T. (2018). Collision imminent steering using nonlinear model predictive control. In 2018 *Annual American Control Conference*, 4772-4777.

Wurts, J., Stein, J. L., and Ersal, T. (2019). Minimum slip collision imminent steering in curved roads using nonlinear model predictive control. In 2019 *Annual American Control Conference*.

The citation of any document is not to be construed as an admission that it is prior art with respect to the present invention.

Thus, we have developed a vehicle control formulation that is conscious of and incorporates model parameters estimated from online implementation. For one non-limiting example case, we simulate vehicle control with an unknown coefficient of friction. Using existing estimation methods for the coefficient of friction and uncertainty of the coefficient of friction, our controller prescribes control actions that are provably safe if the coefficient of friction is higher or lower than what is estimated. We show the contingent formulation incorporating uncertainty can provide improved robustness over fixed parameter control methods and adaptive nominal parameter control methods.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A driving control system for a vehicle comprising a vehicle control system configured to steer wheels of the vehicle, the driving control system comprising:
    a plurality of sensors coupled to the vehicle; and
    a controller in electrical communication with the plurality of sensors and the vehicle control system, the controller being configured to execute a program to:
        (i) receive information about a location of an object from at least one of the plurality of sensors;
        (ii) determine a sequence of control inputs to avoid a collision between the vehicle and the object based on the location of the object, and
        (iii) cause the vehicle control system of the vehicle to perform a vehicle maneuver based on the sequence of control inputs,
    wherein the sequence of control inputs to avoid the collision is determined by
        (a) determining an optimized vehicle path to avoid a collision between the vehicle and the object based upon an initial coefficient of friction value between the vehicle and a road surface,
        (b) determining a vehicle deviation from the optimized vehicle path,
        (c) updating, based at least in part on a measured kinematic state of the vehicle, a coefficient of friction value responsive to the determination that the vehicle deviates from the optimized vehicle path, the measured kinematic state of the vehicle including one or more of a position of the vehicle, a yaw angle of the vehicle, a velocity of the vehicle, a yaw rate of the vehicle, and a steering angle of the vehicle; and
        (d) causing the vehicle control system to perform a correction in the vehicle maneuver based on the updated coefficient of friction value.

2. The driving control system of claim 1, wherein updating the coefficient of friction includes using an Unscented Kalman filter (UKF) method.

3. The driving control system of claim 2, wherein the UKF includes a three degree of freedom bicycle model with a state representing the coefficient of friction with trivial dynamics.

4. The driving control system of claim 1, wherein determining the optimized vehicle path and the correction in the vehicle maneuver is performed using a nonlinear model predictive control framework.

5. The driving control system of claim 4, wherein the nonlinear model predictive control (MPC) framework includes modeling the vehicle and modeling a plurality of tires coupled to the vehicle.

6. The driving control system of claim 5, wherein modeling the plurality of tires includes determining a peak tire slip for the lower bound of a coefficient of friction.

7. The driving control system of claim 5, wherein the MPC generates a plurality of coefficient of friction estimations, and wherein an average value of the plurality of coefficient of friction estimations is used for the updated coefficient of friction value.

8. The driving control system of claim 1, wherein the initial coefficient of friction value is greater than a true coefficient of friction value for the road surface, and wherein the correction in the vehicle maneuver includes countersteering towards an inside of a turn away from a lane boundary.

9. The driving control system of claim 1, wherein the controller operates with at least one of a 1 kHz prediction rate or a 50 Hz measurement update, or a combination thereof.

10. The driving control system of claim 1, wherein the controller converges on a true coefficient of friction value between the vehicle and the road surface in less than 250 milliseconds.

11. A method of controlling a vehicle to avoid obstacles, the method comprising:
    detecting an object using a sensor coupled to the vehicle, the object being detected to be located at a distance from the vehicle determined by a controller;

determining an optimized vehicle path to avoid a collision between the vehicle and the object based upon an initial coefficient of friction value between the vehicle and a road surface, determining a steering sequence to follow the optimized vehicle path around the object using feedback received by the controller;

determining, based on the initial coefficient of friction and at least a portion of the steering sequence, a predicted kinematic state of the vehicle;

determining a vehicle deviation from the optimized vehicle path;

measuring a kinematic state of the vehicle;

generating, based on a difference between the predicted kinematic state and the kinematic state, an updated coefficient of friction value when the vehicle deviates from the optimized vehicle path; and performing a correction in the steering sequence based on the updated coefficient of friction value to follow an updated path around the object.

12. The method of claim 11, wherein updating the coefficient of friction includes using an Unscented Kalman filter (UKF) method.

13. The method of claim 12, wherein the UKF includes a three degree of freedom bicycle model with a state representing the coefficient of friction with trivial dynamics.

14. The method of claim 11, wherein determining the optimized vehicle path and performing the correction in the vehicle maneuver includes using a nonlinear model predictive control framework.

15. The method of claim 14, wherein the nonlinear model predictive control (MPC) framework includes modeling the vehicle and modeling a plurality of tires coupled to the vehicle.

16. The method of claim 15, wherein modeling the plurality of tires includes determining a peak tire slip for the lower bound of a coefficient of friction.

17. The method of claim 15, wherein the MPC generates a plurality of coefficient of friction estimations, and wherein an average value of the plurality of coefficient of friction estimations is used for the updated coefficient of friction value.

18. The method of claim 11, wherein the initial coefficient of friction value is greater than a true coefficient of friction value for the road surface, and wherein the correction in the vehicle maneuver includes counter-steering towards an inside of a turn away from a lane boundary.

19. The method of claim 11, wherein the controller operates with at least one of a 1 kHz prediction rate or a 50 Hz measurement update, or a combination thereof.

20. The method control system of claim 11, wherein the controller converges on a true coefficient of friction value between the vehicle and the road surface in less than 250 milliseconds.

* * * * *

UNITED STATES PATENT AND TRADEMARK OFFICE
CERTIFICATE OF CORRECTION

| | | |
|---|---|---|
| PATENT NO. | : 12,122,365 B2 | Page 1 of 1 |
| APPLICATION NO. | : 17/363797 | |
| DATED | : October 22, 2024 | |
| INVENTOR(S) | : Tulga Ersal et al. | |

It is certified that error appears in the above-identified patent and that said Letters Patent is hereby corrected as shown below:

In the Specification

Column 8, Line 39, "to." should be --$t_0$--.

Column 12, Line 35, "to." should be --$t_0$--.

Column 13, Line 36, "16" should be --$1\sigma$--.

Column 13, Line 52, "Uncertainty based MPC" should be --Uncertainty MPC--.

Column 13, Line 53, "Uncertainty based MPC" should be --Uncertainty MPC--.

Column 13, Line 54, "Uncertainty based MPC" should be --Uncertainty MPC--.

Signed and Sealed this
Tenth Day of December, 2024

Katherine Kelly Vidal
*Director of the United States Patent and Trademark Office*